(12) United States Patent
Maki et al.

(10) Patent No.: US 8,760,540 B2
(45) Date of Patent: Jun. 24, 2014

(54) IMAGING DEVICE AND CONTROL METHOD OF THE SAME

(75) Inventors: Takashi Maki, Yokohama (JP); Takayoshi Shimizu, Machida (JP)

(73) Assignee: Ricoh Company, Ltd., Tokyo (JP)

( * ) Notice: Subject to any disclaimer, the term of this patent is extended or adjusted under 35 U.S.C. 154(b) by 398 days.

(21) Appl. No.: 13/143,667

(22) PCT Filed: Jan. 27, 2010

(86) PCT No.: PCT/JP2010/051454
§ 371 (c)(1),
(2), (4) Date: Jul. 7, 2011

(87) PCT Pub. No.: WO2010/087500
PCT Pub. Date: Aug. 5, 2010

(65) Prior Publication Data
US 2011/0267500 A1    Nov. 3, 2011

(30) Foreign Application Priority Data

Jan. 29, 2009    (JP) ................................. 2009-017579

(51) Int. Cl.
*H04N 5/76*    (2006.01)
(52) U.S. Cl.
USPC .................................. 348/231.99; 348/231.2
(58) Field of Classification Search
USPC ......................................... 348/231.2, 231.99
See application file for complete search history.

(56) References Cited

U.S. PATENT DOCUMENTS

| | | | |
|---|---|---|---|
| 7,310,447 B2 | 12/2007 | Yano et al. | |
| 7,315,651 B2 | 1/2008 | Sakuyama et al. | |
| 7,333,664 B2 | 2/2008 | Sakuyama et al. | |
| 7,359,549 B2 | 4/2008 | Ikebe et al. | |
| 7,409,095 B2 | 8/2008 | Sakuyama et al. | |
| 7,454,069 B2 | 11/2008 | Kodama et al. | |
| 7,505,630 B2 | 3/2009 | Sakuyama et al. | |
| 7,526,144 B2 | 4/2009 | Maki et al. | |
| 7,626,733 B2 | 12/2009 | Kodama et al. | |
| 7,750,939 B2 | 7/2010 | Kobayashi et al. | |
| 2004/0095477 A1 | 5/2004 | Maki et al. | |
| 2004/0208380 A1 | 10/2004 | Aoki et al. | |
| 2004/0212843 A1 | 10/2004 | Kodama et al. | |
| 2005/0151854 A1 | 7/2005 | Maki | |

(Continued)

FOREIGN PATENT DOCUMENTS

| | | |
|---|---|---|
| CN | 1855990 A | 11/2006 |
| JP | 2000-32308 A | 1/2000 |

(Continued)

*Primary Examiner* — Joel Fosselman
(74) *Attorney, Agent, or Firm* — Dickstein Shapiro LLP

(57) ABSTRACT

An imaging device includes a lens unit and a device body detachably joined with each other. The lens unit includes an optical lens, an image sensor capturing an optical lens image of a subject having transmitted through the optical lens and outputting an output signal, and an image processing unit executing a plurality of image processings on image data generated from the output signal of the image sensor. The device body includes a display unit displaying the image data, a storage unit storing an image file containing the image data and an image processing unit having a substantially same image processing function as that of the lens unit and executing a plurality of image processings on the image data. The imaging device is configured that the image processings to execute on the image data are changeably allocated to the image processing units of the lens unit and the device body.

13 Claims, 10 Drawing Sheets

(56) References Cited

U.S. PATENT DOCUMENTS

| | | |
|---|---|---|
| 2006/0034549 A1 | 2/2006 | Tanaka et al. |
| 2006/0257133 A1 | 11/2006 | Shikata |
| 2006/0262199 A1* | 11/2006 | Takahashi et al. ......... 348/231.2 |
| 2008/0225146 A1 | 9/2008 | Maki |
| 2009/0096910 A1 | 4/2009 | Yasuda et al. |
| 2009/0122164 A1 | 5/2009 | Maki et al. |

FOREIGN PATENT DOCUMENTS

| | | |
|---|---|---|
| JP | 2000-50130 A | 2/2000 |
| JP | 2006-54709 A | 2/2006 |
| JP | 2006-319430 A | 11/2006 |

* cited by examiner

IMAGING DEVICE AND CONTROL METHOD OF THE SAME

TECHNICAL FIELD

The present invention relates to an imaging device comprising a device body and a lens unit and a control method of the imaging device, particularly to one configured to changeably allocate a plurality of image processings to be performed on captured image data to the lens unit and the device body according to a setup and an operation state of the device body.

BACKGROUND ART

There is an imaging device such as a single lens reflex digital camera including a camera body and an interchangeable lens unit to be integrated with the camera body. Such a digital camera can allow a user to select a desirable lens type with a certain angle of field or brightness and mount the lens in the camera body with an image sensor of a large capacity to capture images with high sensitivity without a large amount of blur or noise. A camera body of such a digital camera comprises an image sensor and an image processor (image processing engine).

Generally, types of the lens unit combinable with the camera body are limited in most single lens reflex digital cameras. In order to solve this, Japanese Laid-open Patent Publication No. 2006-54709 (Reference 1) discloses an imaging device which comprises a lens unit including an image sensor and an image processor to generate image data in predetermined format to transmit the data to a camera body, for example. Thereby, various kinds of lens units can be combined with the camera body, improving versatility of the camera body and the lens unit.

For another example, Japanese Laid-open Patent Publication No. 2000-32308 (Reference 2) discloses an imaging system which comprises an interchangeable imaging unit (equivalent to the lens unit) with an image sensor to generate image data of a subject and a data processor (equivalent to the camera body) connected with the imaging unit to process the image data. With such a configuration, an imaging system with a downsized imaging unit and high-speed image data processing can be achieved.

The imaging device in Reference 1 is composed of a camera head (equivalent to the interchangeable lens unit) with an image sensor and a camera body. A digital signal processor (image processor) is provided in each of the camera head and the camera body. Image signals are transmitted from the camera head to the camera body in JPEG format only. Accordingly, the camera body can perform image processing irrespective of the camera head.

With such a configuration, various kinds of lens unit can be mounted in a single camera body. However, there is a problem that the format of image data from the camera head to the camera body is fixed to JPEG format, limiting the types of format of images storable in the camera body. In storing image data in format other than JPEG, compressed image data has to be decompressed and then reprocessed (recompressed), which deteriorates quality of images.

Therefore, the imaging device in Reference 1 needs to include communication lines between the camera head and the camera body which can deal with the maximum amount of captured image data since the device cannot change processes which the image processors of the camera head and of the camera body perform in accordance with an operational state of the device.

Meanwhile, the imaging system in Reference 2 is configured that the imaging unit processes output signals of the image sensor to generate image data and transmits it to the data processor. The data processor includes a display unit displaying received image data and a storage unit to store image data.

This imaging system does not need a circuit dedicated for image processing in the imaging unit, preventing increases in circuit scale and manufacturing costs. However, since analog signals of the image sensor are transmitted from the imaging unit to the data processor, they need to be transferred by low voltage differential signaling (LVDS), especially with use of CMOS as an image sensor. This results in increasing the number of communication lines by about 20%.

DISCLOSURE OF THE INVENTION

The present invention aims to provide an imaging device which includes image processing units in both of an interchangeable lens unit and a device body to change image processings of the two units in accordance with an operational state of the device body and reduce the number of communication lines by reducing data amount communicated between the lens unit and the device body, as well as to provide a control method of the imaging device.

According to one aspect of the present invention, an imaging device comprises: a lens unit which is detachably joined with a device body and comprises an optical lens, an image sensor capturing an optical image of a subject having transmitted through the optical lens and outputting an output signal, and an image processing unit having a substantially same image processing function as that of the lens unit and executing a plurality of image processings on image data generated from the output signal of the image sensor; the device body which comprises a display unit displaying the image data, a storage unit storing an image file containing the image data and an image processing unit executing a plurality of image processings on the image data; and an allocating unit which changeably allocates the plurality of image processings to be executed on the image data to the image processing units of the lens unit and of the device body.

In one features of the above aspect, the imaging device further comprises an interface connecting the lens unit and the device body for bi-directional communication, in which the image processing unit of the lens unit performs the image processings based on setup data and operation data of the device body informed via the interface; and the image processing unit of the device body performs the image processings based on the setup data and operation data of the device body.

In the other features of the above aspect, the image processing units of the lens unit and the device body perform their respective image processings based on a data transfer capacity (communication bandwidth) of the interface and the setup data and operation data of the device body.

In the other features of the above aspect, when data on an operation mode contained in the setup data of the device body indicates a live view mode, the lens unit converts the captured subject image into compressed image data and then transfers the image data to the device body with a predetermined time interval, and the device body decompresses the compressed image data from the lens unit and outputs the decompressed image data to the display unit with a predetermined time interval.

In the other features of the above aspect, when data on an operation mode contained in the setup data of the device body indicates a live view mode, the lens unit converts the captured subject image into image data and then transfers the image data to the device body with a predetermined time interval, and the device body outputs the image data from the lens unit to the display unit with a predetermined time interval.

In the other features of the above aspect, when data on an operation mode contained in the setup data of the device body indicates a live view mode, the lens unit converts an output signal from the image sensor into digital data and transfers the digital data to the device body with a predetermined time interval, and the device body converts the digital data from the lens unit into image data and outputs the image data to the display unit with a predetermined time interval.

In the other features of the above aspect, when data on an operation mode contained in the setup data of the device body indicates a still image mode, the lens unit converts an output signal from the image sensor into digital data and then transfers the digital data to the device body, and the device body converts the digital data from the lens unit into an image file for storing in the storage unit and into image data for output to the display unit.

In the other features of the above aspect, when data on an operation mode contained in the setup data of the device body indicates a still image mode, the lens unit converts an output signal from the image sensor into digital data and then transfers the digital data to the device body, and the device body converts the digital data from the lens unit into a compressed image file for storing in the storage unit and into image data for output to the display unit.

In the other features of the above aspect, when data on an operation mode contained in the setup data of the device body indicates a still image mode, the lens unit converts the captured subject image into compressed image data and then transfers the image data to the device body, and the device body converts the compressed image data from the lens unit into a compressed image file for storing in the storage unit and decompresses the compressed image data for output to the display unit.

In the other features of the above aspect, when data on an operation mode contained in the setup data of the device body indicates a video mode, the lens unit compresses and converts the captured subject image into video data and then transfers the video data to the device body, and the device body converts the compressed video data from the lens unit into a compressed video file for storing in the storage unit and decompresses the compressed video data for output to the display unit.

In the other features of the above aspect, when data on an operation mode contained in the setup data of the device body indicates a video mode, the lens unit converts the captured subject image into compressed video data and then transfers the video data to the device body, and the device body converts the compressed video data from the lens unit into a compressed video file in a different format for storing in the storage unit and decompresses the compressed video data for output to the display unit.

In the other features of the above aspect, when data on an operation mode contained in the setup data of the device body indicates a video mode, the lens unit converts the captured subject image into compressed video data in two different formats and then transfers the video data to the device body, and the device body converts one of the two formats of the compressed video data from the lens unit into a compressed video file for storing in the storage unit and decompresses the other of the two formats of the compressed video data for output to the display unit.

According to another aspect of the present invention, a control method of an imaging device is provided. The imaging device comprises a lens unit which is detachably joined with a device body and comprises an optical lens, an image sensor capturing an optical image of a subject having transmitted through the optical lens and outputting an output signal, and an image processing unit executing a plurality of image processings on image data generated from the output signal of the image sensor; the device body which comprises a display unit displaying the image data, a storage unit storing an image file containing the image data and an image processing unit executing a plurality of image processings on the image data; a software program to changeably allocate the plurality of image processings to the image processing unit of the lens unit and that of the device body; and an interface connecting the lens unit and the device body for bi-directional communication. The control method comprises the step of, in accordance with the software program, determining image processings which the device body and the lens unit are to perform based on data communicated via the interface.

In one features of the above aspect, the data communicated via the interface is setup data and operation data of the device body.

In the other features of the above aspect, the data communicated via the interface is setup data and operation data of the device body and data on a data transfer capacity of the interface

BRIEF DESCRIPTION OF THE DRAWINGS

The present invention will be described below with reference to the following description of an exemplary embodiment and the accompanying drawings in which.

PREFERRED EMBODIMENT OF THE INVENTION

Figure 1A:
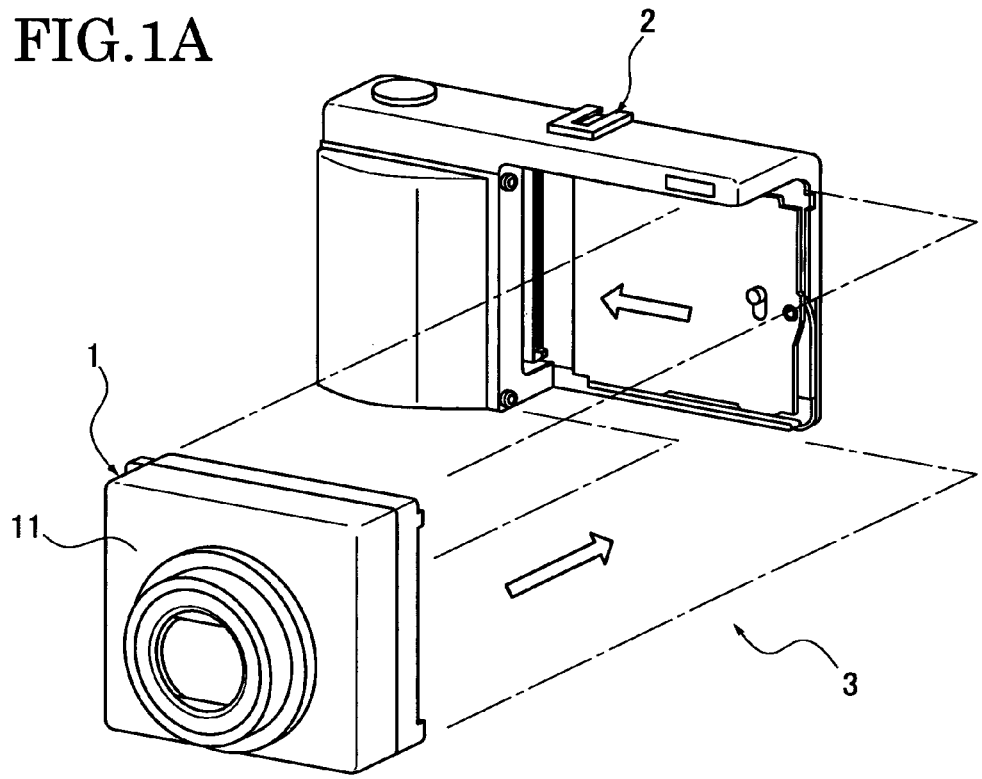
FIGS. 1A, 1B are perspective views of an imaging device according to one embodiment of the present invention.
Figure 1B:
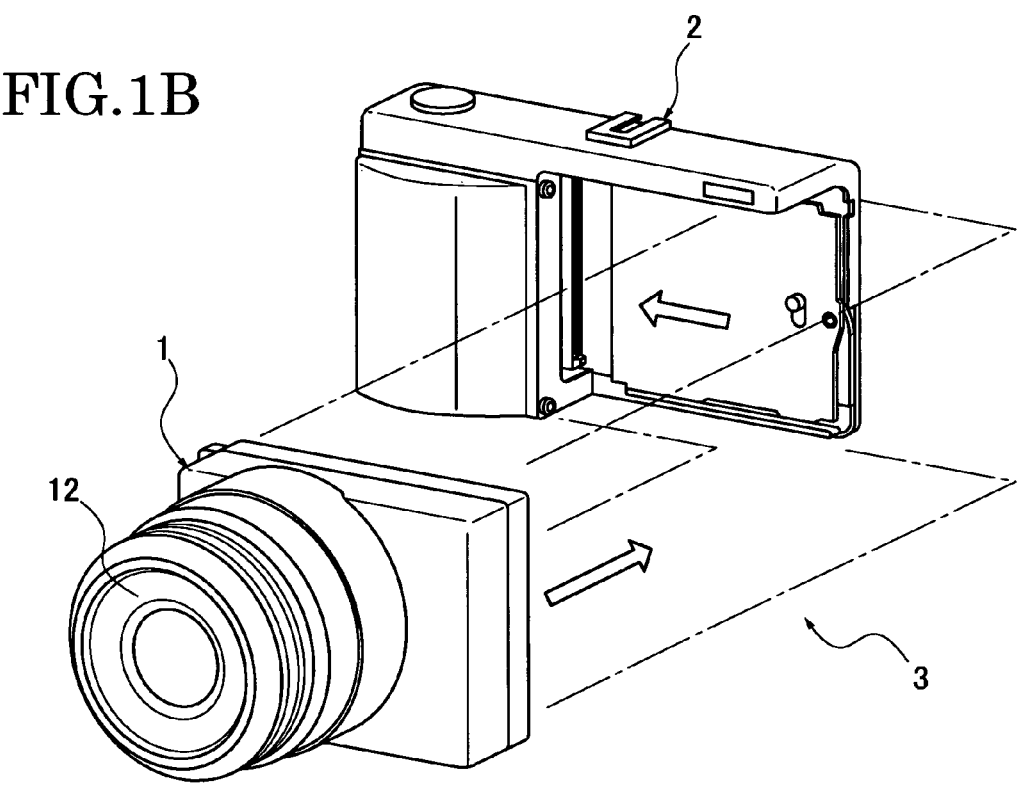

Hereinafter, an embodiment of the present invention will be described in detail with reference to the accompanying drawings. FIG. 1 shows one example of an imaging device (digital camera) according to the present invention. In FIG. 1 an imaging device 3 is comprised of a device body 2 and a lens unit 1 detachably mounted in the device body 2. The lens unit 1 and the device body 2 are integrated with each other to function as an imaging device. The lens unit 1 can be selected by a user from various types of lens units, and it can incorporate a single focus lens as a lens unit 11 (FIG. 1A) or an optical zoom lens as a lens unit 12 (FIG. 1B), for example.

Figure 2:
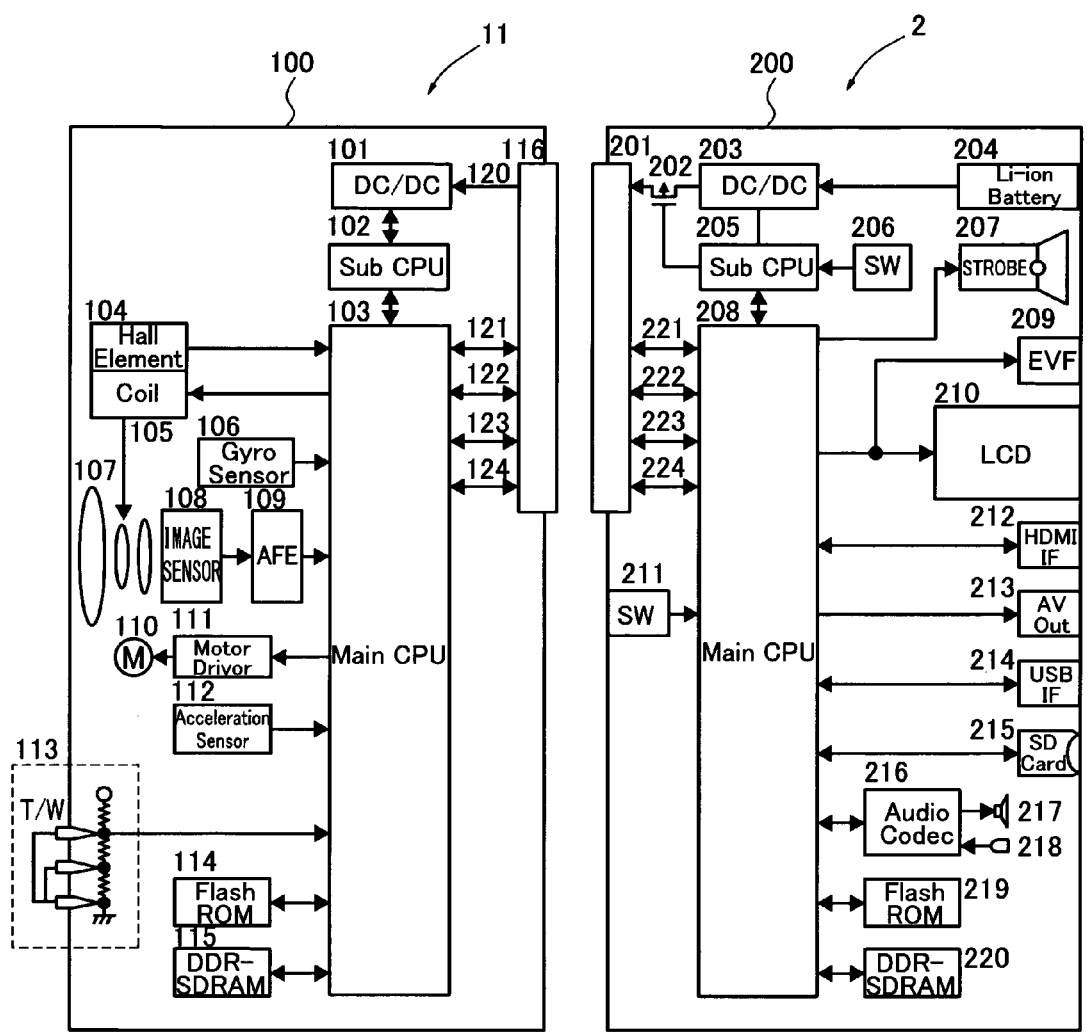
FIG. 2 is a function block diagram of an example of a lens unit and a device body constituting the imaging device according to one embodiment of the present invention.

Next, the structure and functions of the imaging device according to the present invention will be described with reference to FIG. 2 to FIG. 4. FIG. 2 is a function block diagram of a single focus lens unit 100 and a device body 200. In FIG. 2 a lens unit 100 is one example of a function block of the lens unit 11 while the device body 200 is one example of a function block of the device body 2. The lens unit 100 comprises a lens group 107 including a focus lens, an image sensor 108 receiving an optical image of a subject via the lens group 107 and converting it into an electric signal for outputs, an analog front end (AFE) 109 converting an output signal (analog image data) from the image sensor 108 into digital image data, and a main CPU 103 (image processing engine) executing a predetermined image processing on the digital image data such as YUV data conversion, JPEG compression, and RAW data creation.

The lens unit 100 also comprises a joint connector 116 as an interface electrically connecting with the device body 200, a bi-directional bus 123 transmitting image data to the device body 200 via the joint connector 116, and signal lines 121, 122, 124 for a control signal, a serial interface signal and an SDIO signal respectively.

The lens unit 100 also comprises a motor driver 111 controlling a motor to drive a lens barrel of the lens group 107. The motor driver 111 is controlled by the control signal from the device body 200 to perform various operations such as containing a lens barrel at a power-off of the imaging device 3 or changing magnification by pressing a not-shown button.

The lens unit 100 comprises a DC/DC converter 101 generating necessary electric power to operate the lens unit 100 from electric power 120 supplied from the device body 200, a sub CPU 102 detecting the electric power 120 supplied from the device body 200 to control the DC/DC converter 101, and a detector circuit 113 detecting a tele-converter lens and a wide converter lens mounted in the exterior of the lens unit 100.

Further, the lens unit 100 comprises a gyrosensor 106 detecting an inclination of the imaging device 3, an acceleration sensor 112 detecting acceleration to the imaging device 3, a coil 105 driving the lens group 107 according to the inclination detected by the gyrosensor 106 and the acceleration detected by the acceleration sensor 112, and a hall element 104 detecting a driving amount of the coil 105. These components achieve a camera shake preventing function.

In the lens unit 100 a software program to execute image processing and operation control processing is stored in a flash ROM 114 and the main CPU 103 uses a RAM 115 as a work area to operate the respective components and control processing thereof.

The device body 200 in FIG. 2 comprises a joint connector 201 as an interface electrically connecting with the lens unit 100, a bi-directional bus 223 receiving image data from the lens unit 100 and transferring it to a main CPU 208, the main CPU 208 receiving the image data via the bi-directional bus 223 and execute image processing on the image data such as YUV data conversion, JPEG data compression, decompression of JPEG data, RAW data generation, and signal lines for a control signal 221, a serial interface signal 122, and an SDIO signal 221 which are connected with the signals lines of the lens unit 100, respectively.

The device body 200 also comprises a release switch being pressed to start a photographic operation of the imaging device 3, a switch 206 including a cross key to select an operation mode of the imaging device 3 and else, a lithium ion buttery 204, a DC/DC converter 203, a power-on switch 202 to supply power to the lens unit 100, a sub CPU 205 detecting an input to the switch 206 to perform a predetermined set up, controlling electric power from the lithium ion buttery 204 with the DC/DC converter 203, and controlling a power supply switch 202 supplying electric power to the lens unit 100.

In the device body 200 a software program to execute image processing and operation control processing is stored in a flash ROM 219 and the main CPU 208 uses a RAM 220 as a work area to operate the respective components and control processing thereof.

Further, the device body 200 comprises an audio codec 216, a microphone 218 inputting an audio signal to the audio codec 216, a speaker 217 outputting sound from the audio codec 216, a USB interface connector 214, an AV output connector 213, a HDMI signal interface connector 212, an SD memory 215 as a detachable storage unit storing captured image files, a strobe portion 207 functioning as a connecting circuit to mount a stroboscope in the device body 200, and an LCD 210 and an electronic viewfinder (EVF) 209 as a display unit displaying a subject image at focusing and captured image data at shooting according to manipulation to the switch 211.

Figure 3:
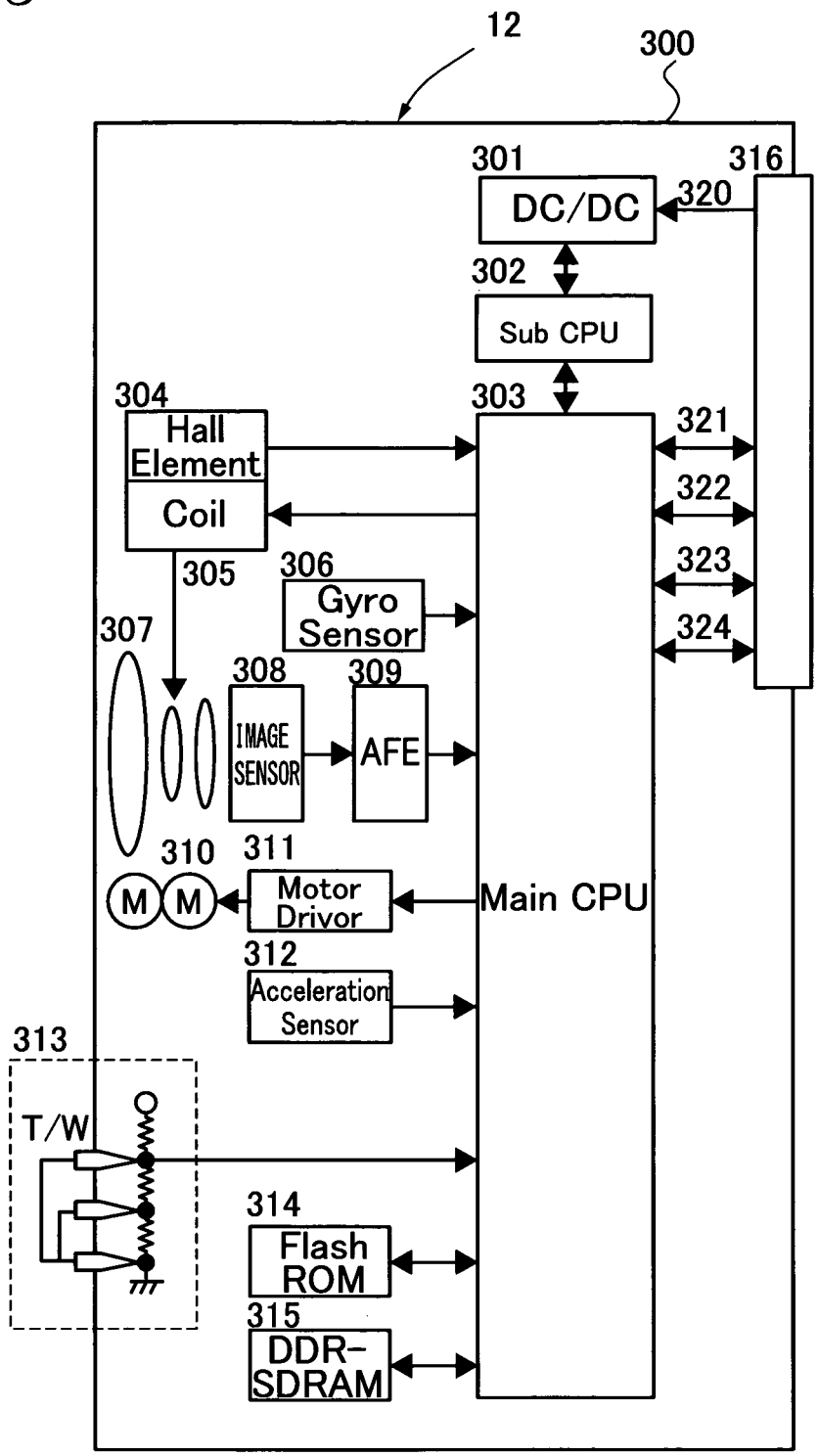
FIG. 3 is a function block diagram of another example of the lens unit.

FIG. 3 is a function block diagram of another example of the lens unit 1 including an optical zoom lens (lens unit 12) as a component of the imaging device according to one embodiment of the present invention. The lens unit 300 in FIG. 3 has the same structure as the lens unit 100 in FIG. 2 except for inclusion of the optical zoom lens in the lens group 307 and a zoom motor 310 driving the zoom lens. In the lens unit 300 a focus lens and a zoom lens in the lens group 307 is moved to a predetermined position in accordance with a manipulation to a not-shown zoom switch of the device body 200.

Figure 4:
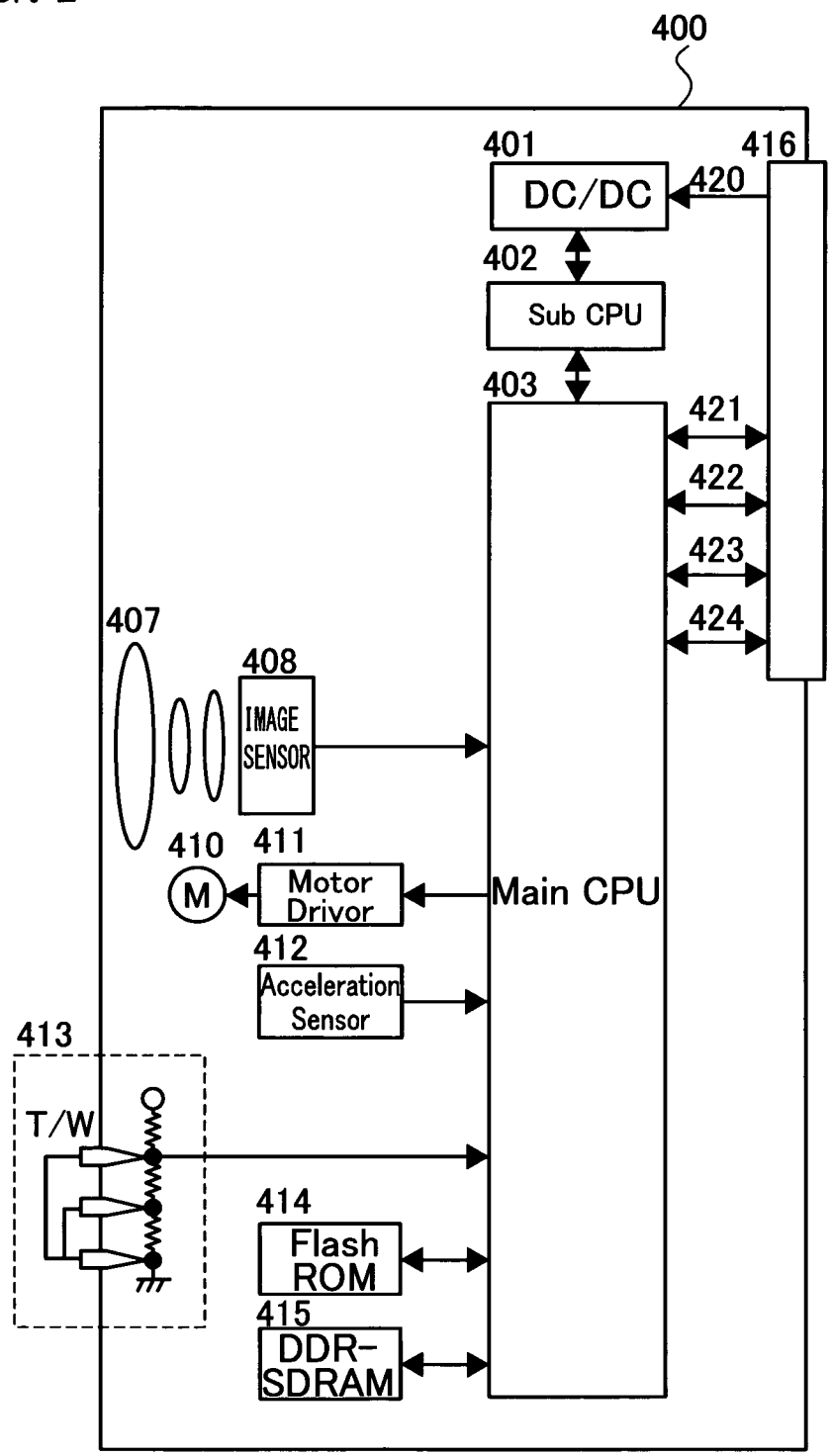
FIG. 4 is a function block diagram of another example of the lens unit.

FIG. 4 is a function block diagram of still another example of the lens unit 1 as a component of the imaging device according to the present invention. A lens unit 400 in FIG. 4 has the same structure as the lens unit 100 in FIG. 2 except for inclusion of a large-size image sensor 408 and exclusion of the hall element 104, coil 105, and gyrosensor 106 for camera shake preventing function.

The imaging device 3 as above is configured to be able to change setting of bus widths of bi-directional buses 123, 124 of the lens unit 100 and the device body 200 according to an operation mode as well as an image recording size or format. Accordingly, the bus widths are made changeable when appropriate in accordance with transmitted/received data amount. Further, the imaging device 3 is configured to allocate a plurality of image processings to be performed on captured image data to the lens unit 100 and the device body 200 in accordance with data amount transmitted/received between the lens unit 100 and the device body 200 which changes according to a set shooting mode. Also, even image data halfway processed can be transferred between the lens unit and the device body when necessary irrespective of the stage of ongoing image processing. Note that data communication system between the lens unit 100 and the device body 200 can be determined arbitrarily from various transfer systems such as DMA transfer, packet transfer and the like.

The imaging device incorporating the lens unit 300 or the lens unit 400 can also achieve the above processings. Therefore, in the following an example of using the lens unit 100 will be described unless otherwise mentioned. The operations of the imaging device 3 is controlled by a software program stored in the flash ROM 114 of the lens unit 100 and the flash ROM 219 of the device body 200.

Figure 5:
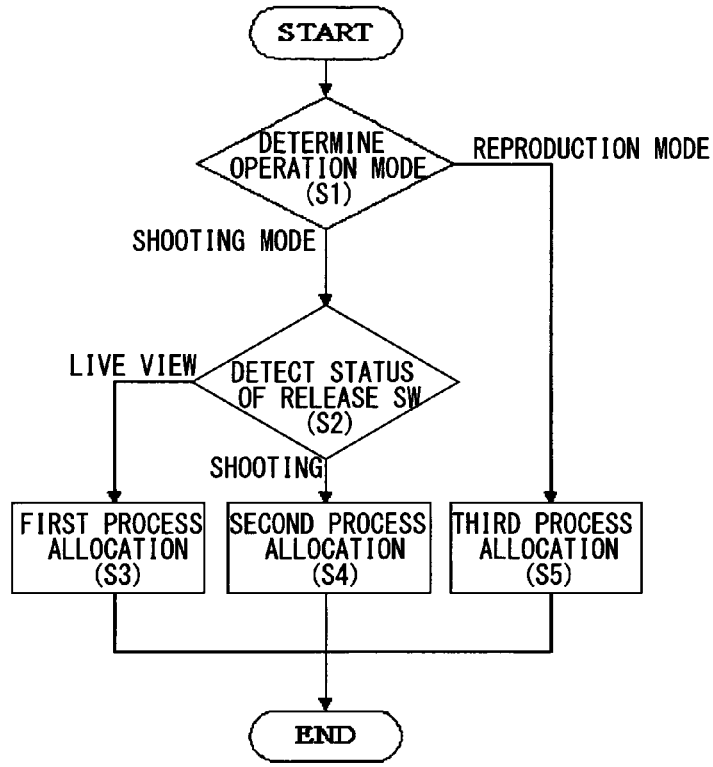
FIG. 5 is a flowchart showing an example of how to allocate image processing (allocating unit) in the imaging device.

FIG. 5 is a flowchart for allocating a plurality of image processings by a software program (allocating unit) after power-on of the imaging device 3. Upon a predetermined manipulation (full press, sliding or else) to a not-shown power-on switch, the imaging device 3 is turned on.

Upon the turning-on of the imaging device 3, in step S1 an operation mode preset with the switch 206 (FIG. 2) of the main unit 200 is determined. When the set operation mode is a reproduction mode in which a recorded image file is displayed on the display unit (S1), a third process allocation is set to the lens unit 100 and the device body 200 in step S5.

When the operation mode is a shooting mode in which a captured subject image is recorded in step S1, a status of the release switch 211 (FIG. 2) of the device body 200 is determined. With the release switch 211 being in a live view state (SW 211 halfway pressed, for example), a first process allocation is set to the lens unit 100 and device body 200 in step S3. With the release switch 211 being in a shooting state (SW 211 fully pressed, for example), a second process allocation is set to the lens unit 100 and the device body 200 in step S4.

In the present embodiment, the process allocation is defined as allocating a plurality of image processings to be performed on captured image data to the lens unit 100 and the device body 200 in the shooting and reproduction operations of the imaging device according to the present invention. In the first to third process allocations, image processings which the lens unit 100 and the device body 200 each perform are differently set.

In the first process allocation, the lens unit 100 performs optical processing to convert an optical subject image received via the lens group 107 into an analog electric signal with the image sensor, A/D conversion to convert the analog electric signal into digital data, YUV conversion to convert the digital data into YUV data, and VGA thinning to thin out the YUV data to be 15 to 30 images in VGA size per second for display on the LCD 210 of the device body 200, JPEG compression to compress the thinned YUV data in JPEG format, and periodic transmission to transmit the JPEG data to the device body 200 with a predetermined time interval. Meanwhile, the device body 200 performs periodic reception to receive the JPEG data from the lens unit 100 with a predetermined time interval, data decompression to decompress the received JPEG data to the YUV data, and YUV data output to the LCD 210.

In the second process allocation, the lens unit 100 performs the optical processing and A/D conversion, outputs the digital data as RAW data, and transmits the RAW data to the device body 200 while the device body 200 receives the RAW data from the lens unit 100, converts the RAW data into YUV data, converts the YUV data into one in a predetermined size, compresses the converted YUV data to JPEG data, creates a JPEG file by adding predetermined header information and the like to the JPEG data, and transmits it to the storage unit such as the SD memory 215 or RAM 220 storing an image file. Note that in the second process allocation, when the image file format of the device body 200 is RAW format, the device body 200 can be set to transmit the received RAW data to the SD memory 215 or RAM 220 for storage without performing the YUV conversion and JPEG compression.

In the third process allocation, the lens unit 100 does not perform any image processing while the device body 200 reads the image file stored in the SD memory and else, converts the read image file into YUV data displayable on the LCD 210, and adjusts the size of the YUV data to be output to the LCD 210. The YUV data conversion is changed depending on the image file format, JPEG or RAW and properly performed by selecting the JPEG or RAW.

Next, operation flow of the first to third process allocations of the lens unit 100 and the device body 200 and flow of image data communicated between the two units will be described with reference to FIG. 6 to FIG. 14.

First Example

Figure 6:
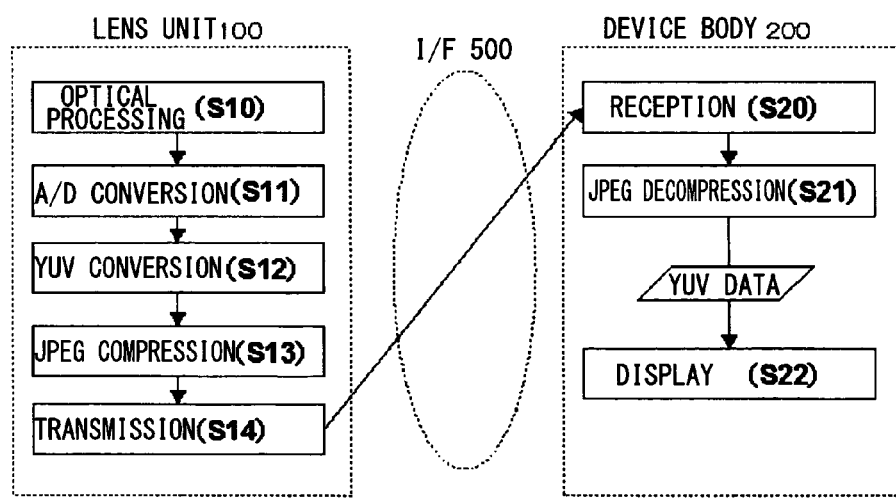
FIG. 6 is a flowchart showing an example of image processing in live view operation of the imaging device.

FIG. 6 is a flowchart for describing the first process allocation. An interface (I/F) 500 is a communication interface (numeric codes 116, 316, 416, 201 in FIGS. 2 to 4) to connect the lens unit 100 and the device body 200.

Given the first process allocation, in accordance with a predetermined live view operation, the lens unit 100 outputs an electric signal converted by the image sensor 108 from a subject image captured via the lens group 107 in step S10, and converts the electric signal into digital data to create RAW data in step S11. Next, the lens unit 100 converts RAW data into one in an image size adapted to the LCD 210 of the device body 200 and further converts the data into YUV data in step S12. Then, it compresses the YUV data in JPEG format in step S13 to transmit it to the device body 200 in step S14.

Meanwhile, the device body 200 receives the JPEG data from the lens unit 100 via the interface (I/F) 500 in step S20, decompresses the JPEG data to create YUV data in step S21, and outputs the YUV data to the LCD 210 as a display unit (FIG. 2) to view the subject image on live in step S22.

Thus, the first process allocation is set in live view operation and image data communicated via the interface 500 is compressed in JPEG format. Accordingly, the amount of data communicated can be reduced.

Second Example

Figure 7:
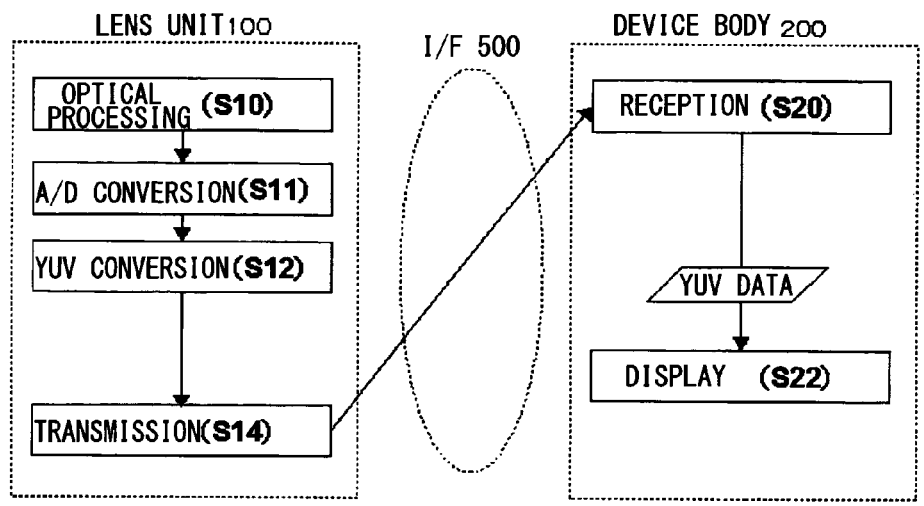
FIG. 7 is a flowchart showing another example of the image processing in the live view operation.

FIG. 7 is a flowchart of another example of the first process allocation. In accordance with a predetermined live view operation, the lens unit 100 outputs an electric signal converted by the image sensor 108 from a subject image captured via the lens group 107 in step S10, and converts the electric signal into digital data to create RAW data in step S11. Next, the lens unit 100 converts RAW data into one in an image size adapted to the LCD 210 of the device body 200 and further converts the data into YUV data in step S12. Then, it transmits the YUV data to the device body 200 in step S14.

Meanwhile, the device body 200 receives the YUV data from the lens unit 100 via the interface (I/F) 500 in step S20 and outputs the YUV data to the LCD 210 (FIG. 2) to view the subject image on live in step S22.

In this example, the lens unit 100 only performs A/D conversion and YUV conversion on data without JPEG compression and transmits YUV data to the device body 200. Thus, the device body 200 can omit JPEG decompression and output the received YUV data to the LCD 200. Without the JPEG compression and decompression, it is possible to prevent a delay in image display due to the two processings. However, the interface 500 needs to have a larger data transfer capacity (communication bandwidth) or increase data transfer rate to transfer uncompressed, large-size image data which are likely to be subject to error correction, causing a delay in data transfer.

Third Example

Figure 8:
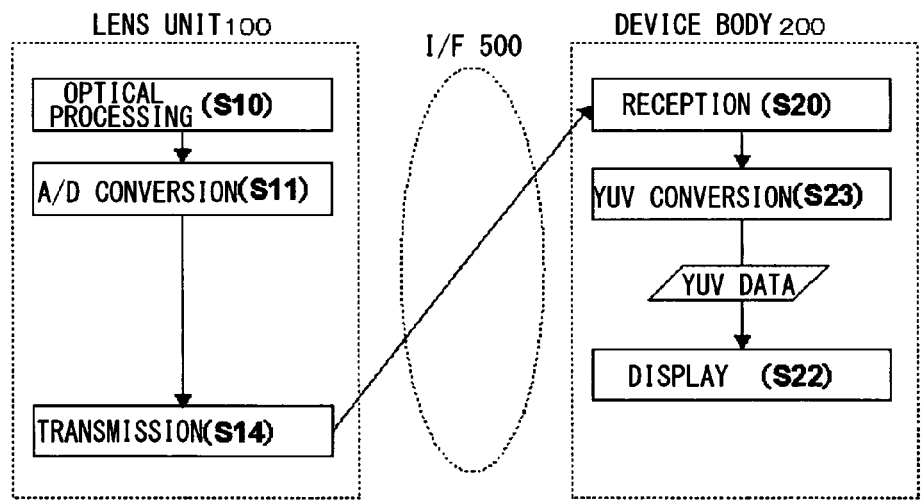
FIG. 8 is a flowchart showing another example of the image processing in the live view operation.

FIG. 8 is a flowchart of another example of the first process allocation. In accordance with a predetermined live view operation, the lens unit 100 outputs an electric signal converted by the image sensor 108 from a subject image captured via the lens group 107 in step S10, and converts the electric signal into digital data to create RAW data in step S11 and outputs it to the device body 200 in step S14.

Meanwhile, the device body 200 receives the RAW data from the lens unit 100 via the interface (I/F) 500 in step S20, converts the RAW data into one in an image size adapted to the LCD 210 of the device body 200 and further converts the data into YUV data in step S23, and outputs the YUV data to the LCD 210 to display the subject image. In this case, with the RAW data smaller in amount than the YUV data, a part of the data transfer capacity (communication bandwidth) of the interface 500 remains unused. The format of RAW data has to be set to be adaptable to all kinds of lens units mounted in the device body since pixel numbers or parameters for the YUV conversion are different among the different lens units.

Next, the data transfer capacity (communication bandwidth) of the interface 500 in the first to third examples will be described. In the first process allocation in the live view mode, assumed that image data transmitted from the lens unit 100 to the device body 200 is of VGA size (640×480 pixels) in non-compression YUV422 format and 30 frames of image data are transmitted per second, amount of data from the lens unit 100 to the device body 200 per second will be about 18 megabytes (640×480×2×30=18, 432,000).

The interface 500 with the data transfer capacity (rate) of larger than 18.432 megabyte/sec can handle non-compressed YUV image data and will not cause display delay in the live view operation. At the data transfer capacity of 18.432 mega byte/sec, about 30 frames of image data are transmitted per second so that data transfer time per frame is 1/30 second (about 33 mil sec.). Here, display delay time will be equivalent to the data transfer time, 1/30 second.

In the first example in which JPEG data is transferred from the lens unit 100 to the device body 200, with a data compression rate of 1/10, data transfer time will be one-tenth of 1/30 which is 1/300 second. Assumed that JPEG compression (S13) and decompression (S21) each take 1/30 second, display delay time will be a sum of the data transfer time and the time for the JPEG compression and decompression, that is, about 69.3 mil second (1/300+1/30+1/30). When it takes 1/300 second for the JPEG compression and decompression, data transfer time will be about 10 mil second (1/300+1/300+1/300) and display delay time will be shorter than that in YUV data transfer.

Generally, at the same data transfer capacity of the interface, transfer of compressed image data to the device body 200 causes less display delay than that of non-compressed data if the total time for the JPEG compression and decompression is shorter than a difference in communication time for data transfer in different amounts. Accordingly, to reduce a display delay, the format of image data to be transferred can be determined according to the data transfer capacity of the interface 500 and the total time for the JPEG compression (S13) and decompression (S21). Also, the image processings which the lens unit 100 and the device body 200 each perform can be changed according to the determined data format.

The data transfer capacity of 18.432 megabyte/sec is not enough to transmit data in larger size than VGA size, for example, full hi-definition size (1920×1080 pixels) in YUV422. To prevent a display delay, the format of image data to be transferred can be determined according to the data transfer capacity of the interface 500, the total time for the JPEG compression (S13) and decompression (S21) and the image size set in the device body 200. The image processings which the lens unit 100 and the device body 200 each perform can be changed according to the determined data format.

Further, the time taken for a processing system to perform the JPEG compression and decompression is varied depending on a load of a communication bus. For example, during storing image data in the SD memory 215 from the main memory (RAM 220) of the device body 200 immediately after shooting a still image, buses of the RAM 220 are used for storing the image data and for the JPEG data compression/decompression at the same time, which takes a longer time for the data compression/decompression to be completed. Accordingly, data transfer system can be selected appropriately depending on a load of the main memory buses.

Fourth Example

Figure 9:
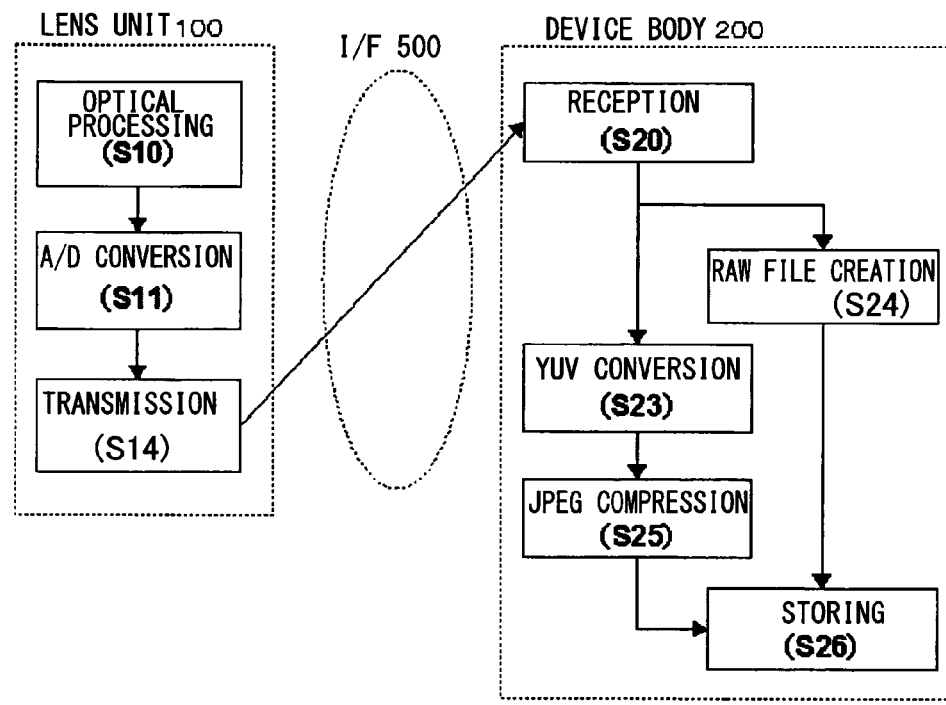
FIG. 9 is a flowchart showing an example of image processing in imaging operation of the imaging device.

Next, the second process allocation will be described with reference to FIG. 9. FIG. 9 is a flowchart for still image shooting of the lens unit 100 and the device body 200 in which the second process allocation is set. In accordance with a predetermined imaging operation, the lens unit 100 outputs an electric signal converted by the image sensor 108 from a subject image captured via the lens group 107 in step S10, and converts the electric signal into digital data to create RAW data in step S11. Then, the lens unit 100 transmits the RAW data to the device body 200 in step S14.

Meanwhile, the device body 200 receives the RAW data from the lens unit 100 via the interface (I/F) 500 in step S20 and adds header information including metadata and the like to the RAW data to create a RAW image file in step S24. The RAW image file is stored in a predetermined storage medium in step S26. With storing of both the RAW image file and JPEG image file set in the device body 200, the received RAW data is converted into YUV data in step S23 and the YUV data is converted into JPEG data to create a JPEG image file by adding predetermined header information to the JPEG data in step S25. The JPEG image file is transmitted to a predetermined storage medium for storage in step S26.

Thus, the imaging device 3 according to one embodiment of the present invention can store image files in different formats by presetting the different formats in the device body 200.

Fifth Example

Figure 10:
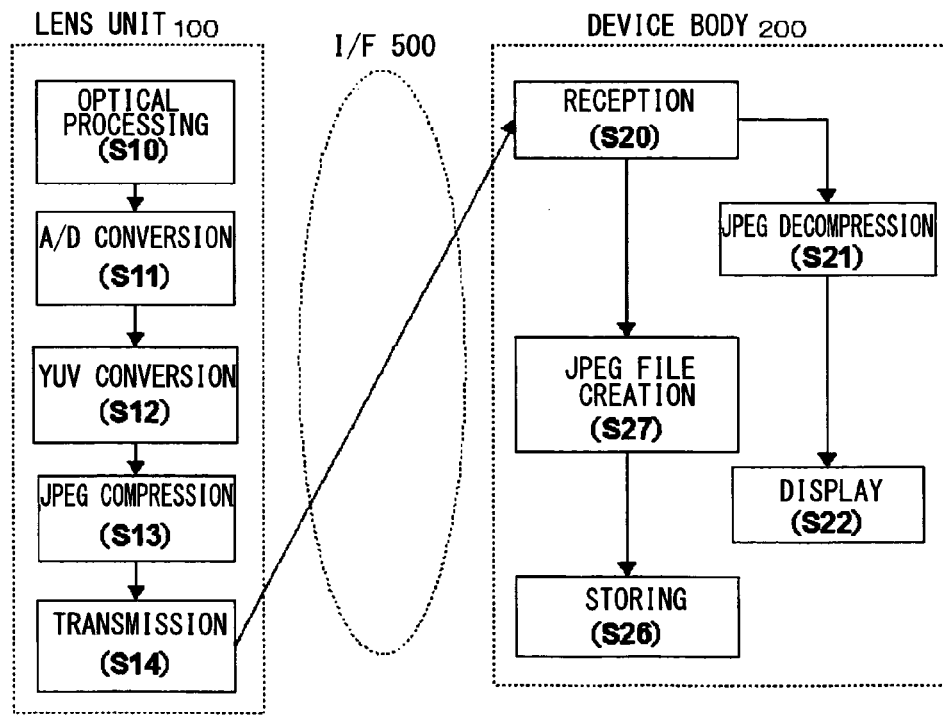
FIG. 10 is a flowchart showing another example of the image processing in the imaging operation.

FIG. 10 is a flowchart of another example of the second process allocation. In the second process allocation, in accordance with a predetermined imaging operation, the lens unit 100 outputs an electric signal converted by the image sensor 108 from a subject image captured via the lens group 107 in step S10, and converts the electric signal into digital data to create RAW data in step S11. Next, the lens unit 100 converts the RAW data into YUV data in step S12 and compresses the YUV data in JPEG format in step S13 to transmit it to the device body 200 in step S14.

Meanwhile, the device body 200 receives the JPEG data from the lens unit 100 via the interface (I/F) 500 in step S20 and adds header information including predetermined metadata to the JPEG data to create a JPEG image file in step S27. The JPEG image file is transmitted to a predetermined storage medium for storage in step S26. Alternatively, the received JPEG data is decompressed to YUV data in step S21, and output to the LCD 210 for display in step S22.

Transfer of RAW image data via the interface 500 takes a longer time than that of JPEG data since RAW image data is larger in amount than JPEG data, which causes a problem that the lens unit 100 cannot attend to the following imaging operation while transmitting image data to the device body 200. In view of solving the problem, it can be configured that in a high-speed continuous shooting mode, the lens unit 100 transmits JPEG compressed data to the device body 200 as in the fifth example. Alternatively, in a high quality image saving mode, the RAW image file is transmitted from the lens unit 100 to the device body 200 for storage without the data compression/decompression, as in the fourth example.

As described above, in the imaging device according to the present invention, the image processings which the lens unit 100 and the device body 200 each execute can be changed in accordance with a set shooting mode of the device body 200. This enables an optimal operation of the imaging device and efficient usage of data transfer capacity of the interface 500.

Sixth Example

Figure 11:
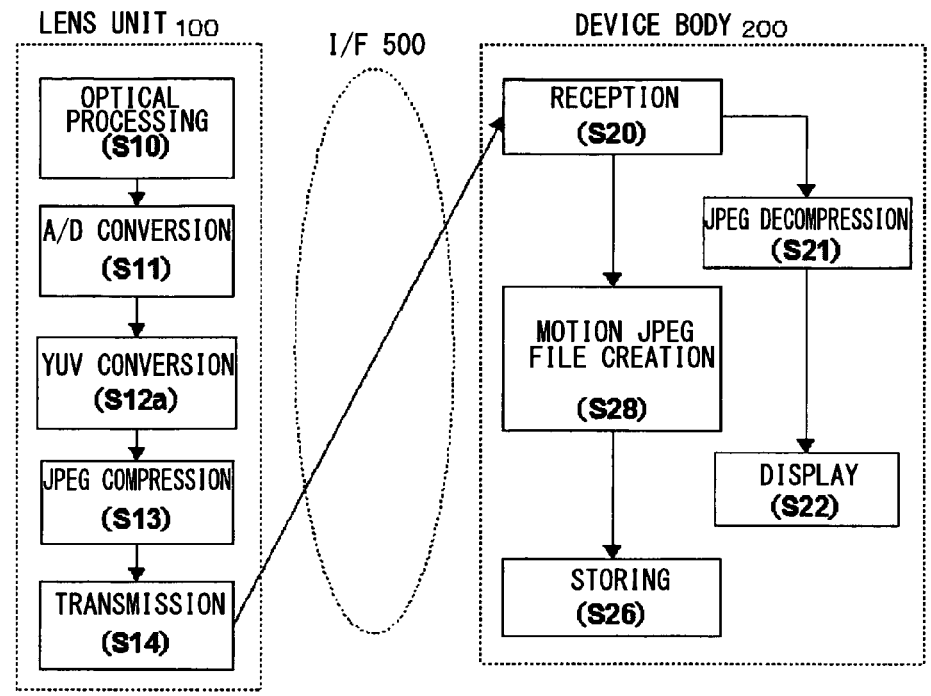
FIG. 11 is a flowchart showing another example of the image processing in the imaging operation.

FIG. 11 is a flowchart of another example of the second process allocation. In the second process allocation, the imaging device records video data in motion JPEG format. In accordance with a predetermined imaging operation, the lens unit 100 outputs an electric signal converted by the image sensor 108 from a subject image captured via the lens group 107 in step S10, and converts the electric signal into digital data to create RAW data in step S11. Next, the lens unit 100 divides the RAW data into small areas and performs YUV conversion on each area of the RAW data with a predetermined time interval in step S12a. Then, it compresses the YUV data in JPEG format in step S13 to sequentially transmit it to the device body 200 in step S14. The above operation flow is repeated while the device body 200 continues to perform shooting operation.

Upon sequentially receiving the JPEG data from the lens unit 100 via the interface 500 in step S20, the device body 200 adds header information including predetermined metadata to the JPEG data to create a JPEG image file in step S27. The JPEG image file is transmitted to a predetermined storage medium (SD memory 215) for storage in step S26. Alternatively, the received JPEG data is decompressed to YUV data in step S21, and output to the LCD 210 for display in step S22.

In this example, since image data received/transmitted via the interface 500 are in JPEG format, the amount of data transfer can be reduced compared to RAW data or YUV data. However, there is a drawback that the JPEG compression/decompression takes a lot of time which is a delay in image display, so that with use of an interface 500 having a sufficiently large throughput, it can be configured that the lens unit 100 transmits RAW data or YUV data and the device body 200 performs necessary processing on the received data for display or storage.

Seventh Example

Figure 12:
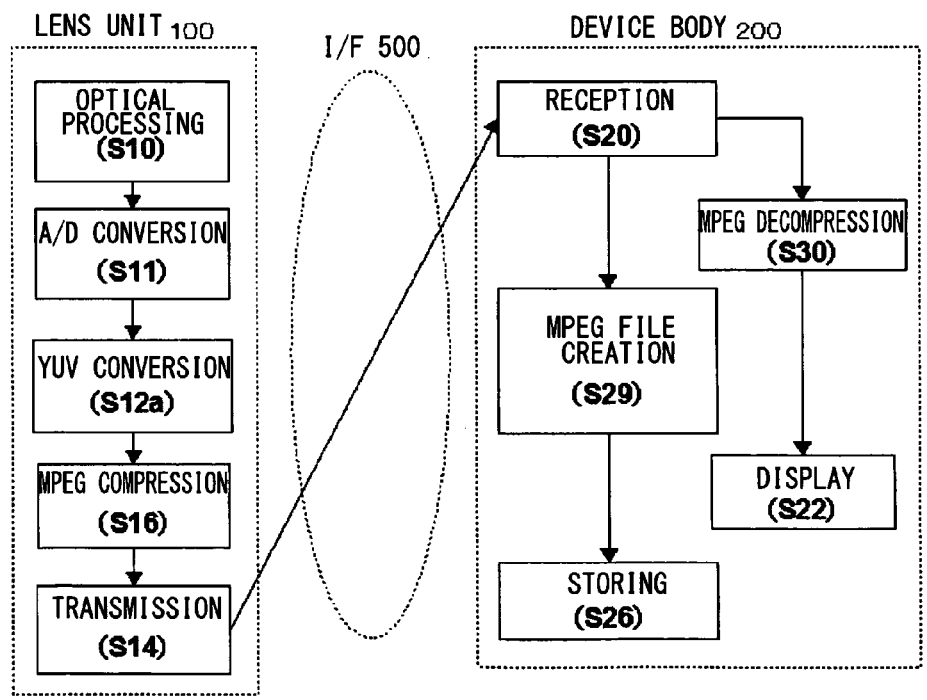
FIG. 12 is a flowchart showing another example of the image processing in the imaging operation.

FIG. 12 shows another example of the second process allocation. In this example, the imaging device records video data in MPEG format. In accordance with a predetermined imaging operation, the lens unit 100 outputs an electric signal converted by the image sensor 108 from a subject image captured via the lens group 107 in step S10, and converts the electric signal into digital data to create RAW data in step S11. Next, the lens unit 100 divides the RAW data into small areas and performs YUV conversion on each area of the data with a predetermined time interval in step S12a. Then, it compresses the YUV data in MPEG format in step S16 to transmit it to the device body 200 in step S14.

Upon receiving the MPEG data from the lens unit 100 via the interface 500 in step S20, the device body 200 adds header information including predetermined metadata to the MPEG data to create a MPEG video file in step S29. The MPEG video file is transmitted to a predetermined storage medium (SD memory 215) for storage in step S26. Alternatively, the received video file is decompressed to YUV data in step S30 and output to the LCD 210 for display in step S22. The operation from the optical processing in step S10 to the storage in step S26 or the display in step S22 is repeated while the device body 200 continues to perform shooting operation.

Eighth Example

Figure 13:
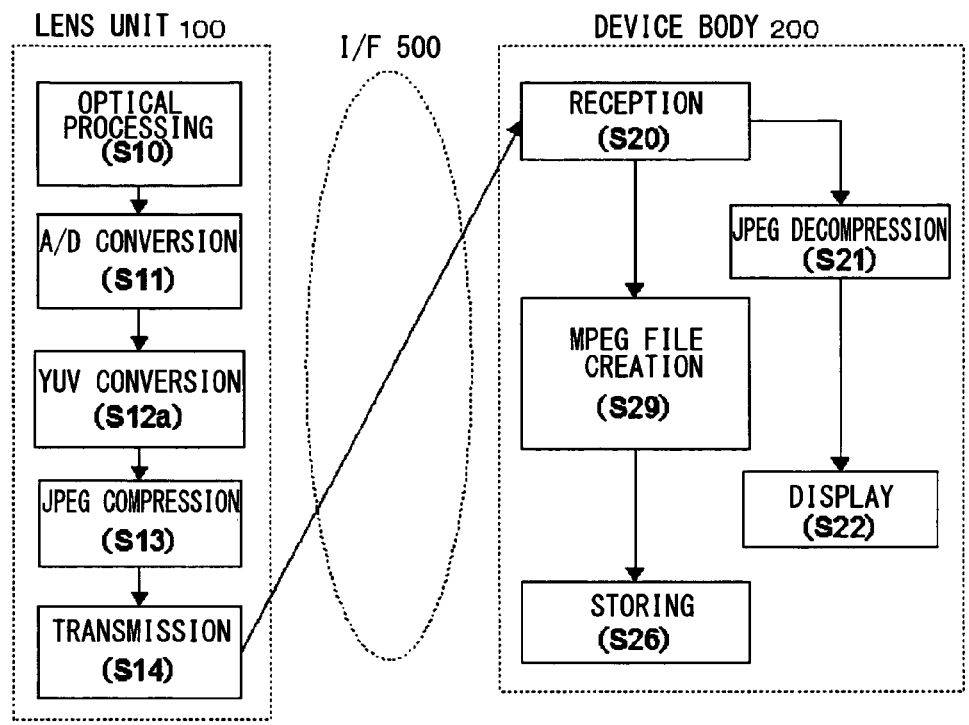
FIG. 13 is a flowchart showing another example of the image processing in the imaging operation.

FIG. 13 shows another example of the second process allocation. In this example, the imaging device records video data in MPEG format. In accordance with a predetermined imaging operation, the lens unit 100 outputs an electric signal converted by the image sensor 108 from a subject image captured via the lens group 107 in step S10, and converts the electric signal into digital data to create RAW data in step S11. Next, the lens unit 100 divides the RAW data into small areas and performs YUV conversion on each area of the data with a predetermined time interval in step S12a. Then, it compresses the YUV data in JPEG format in step S13 to transmit it to the device body 200 in step S14. The operation flow is repeated while the device body 200 continues to perform shooting operation.

Upon receiving the JPEG data from the lens unit 100 via the interface 500 in step 20, the device body 200 converts the data to MPEG data and adds predetermined header information to the MPEG data to create a MPEG video file in step S29. The MPEG video file is transmitted to a predetermined storage medium for storage (SD memory 215) in step S26. Alternatively, the received video file is decompressed to YUV data in step S21 and output to the LCD 210 for display in step S22.

Ninth Example

Figure 14:
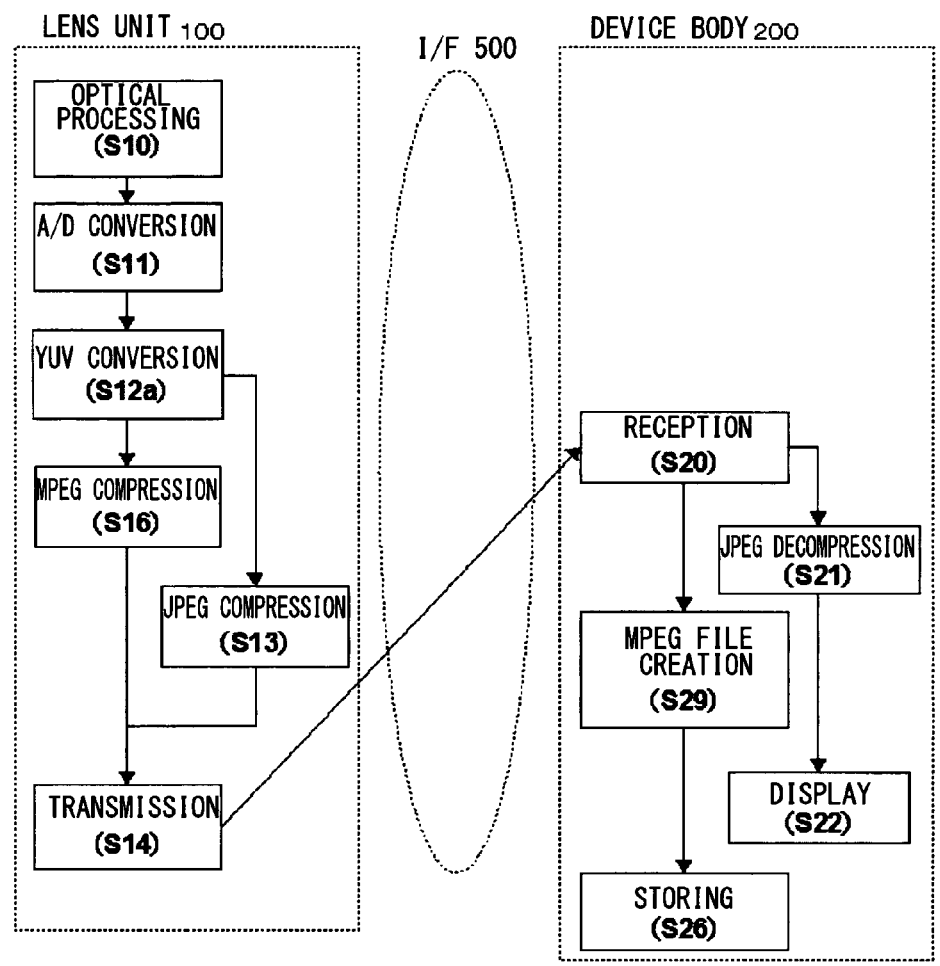
FIG. 14 is a flowchart showing another example of the image processing in the imaging operation.

FIG. 14 shows another example of the second process allocation. In this example, the imaging device records video data. In accordance with a predetermined imaging operation, the lens unit 100 outputs an electric signal converted by the image sensor 108 from a subject image captured via the lens group 107 in step S10, and converts the electric signal into digital data to create RAW data in step S11. Next, the lens unit 100 divides the RAW data into small areas and performs YUV conversion on each area of the data with a predetermined interval in step S12a. Then, it compresses the YUV data in MPEG format in step S16 or JPEG format in step S13 to transmit the data to the device body 200 in step S14. The above operation flow is repeated while the device body 200 continues to perform shooting operation.

Upon receiving the MPEG data and JPEG data from the lens unit 100 via the interface 500 in step 20, the device body 200 adds predetermined header information to the MPEG data to create a MPEG video file in step S29. The MPEG video file is transmitted to a predetermined storage medium (SD memory 215) for storage in step S26. Also, the lens unit 100 decompresses the JPEG data and converts it to YUV data in step S21 and outputs it to the LCD 210 for display in step S22.

In the seventh example, since video data received/transmitted from the lens unit 100 to the device body 200 via the interface 500 are in MPEG format, the amount of data transfer can be reduced compared to RAW data or YUV data. However, there is a drawback that since the MPEG compression (S16) includes interframe differential compression, it takes longer time for the lens unit 100 and the device body 200 to perform the MPEG compression and the MPEG decompression than JPEG compression and decompression, causing a large display delay. Therefore, with use of an interface 500 having a sufficiently large throughput, it can be configured that the lens unit 100 transmits RAW data or YUV data without the compression, and the device body 200 performs necessary processing on the data for display or storing.

In the eighth example, since video data received/transmitted via the interface 500 are in motion JPEG format, the device body 200 can decompress the video data in JPEG format and then compress it in MPEG format again for storing in the storage medium. However, in this case repetition of JPEG compression and decompression and MPEG compression may cause deterioration in quality of stored video data.

In view of preventing the stored video data from deteriorating, the lens unit 100 in the ninth example is configured to perform JPEG compression (S13) and MPEG compression (S16) on image data and simultaneously transmit the image data to the device body 200 via the interface 500.

Regarding audio data simultaneously recorded with video data in the seventh to ninth examples, the device body 200 comprises an audio input system as shown in FIG. 1. However, the present invention is not limited thereto. The lens unit 100 can be configured to include an audio input system to transmit audio data and image data concurrently to the device body via the interface.

As described above, the imaging device according to the present invention comprises an interchangeable lens unit and a device body in which the lens unit is mounted, and can optimally set the process allocation to the lens unit and the device body when appropriate in accordance with any of an operation mode, an image format, and a relation between image size and the data transfer capacity (communication bandwidth) of the interface.

Moreover, in the imaging device according to the present invention, not only that the lens unit 100 and the device body 200 are physically combined, but also they can be connected by wire such as an extension cable. This can realize shooting of a subject at various camera positions which cannot be realized by a prior art imaging device.

Furthermore, with use of a wireless interface between the lens unit 100 and the device body 200, the imaging device can capture various different scenes at various different positions.

According to the present invention, the imaging device comprises the lens unit and the device body combined with each other, can properly change process allocation of image processings to the lens unit and the device body in accordance with an operation mode or a shooting mode set in the device body and a data transfer capacity of the interface. Furthermore, optimally setting the process allocation in the two units makes it possible to reduce the number of communication lines and amount of data transfer.

Although the present invention has been described in terms of exemplary embodiments, it is not limited thereto. It should be appreciated that variations may be made in the embodiments described by persons skilled in the art without departing from the scope of the present invention as defined by the following claims.

The invention claimed is:

1. An imaging device comprising:
    a lens unit which is detachably joined with a device body and comprises an optical lens, an image sensor capturing an optical image of a subject having transmitted through the optical lens and outputting an output signal, and an image processing unit executing a plurality of image processings on image data generated from the output signal of the image sensor;
    the device body which comprises a display unit displaying the image data, a storage unit storing an image file containing the image data and an image processing unit having a substantially same image processing function as that of the lens unit and executing a plurality of image processings on the image data;
    an allocating unit which changeably allocates the plurality of image processings to be executed on the image data to the image processing units of the lens unit and of the device body; and
    an interface connecting the lens unit and the device body for bi-directional communication, wherein the image processing unit of the lens unit performs the image processings based on setup data and operation data of the device body communicated via the interface; and wherein the image processing unit of the device body performs the image processings based on the setup data and operation data of the device body; and
    wherein when data on an operation mode contained in the setup data of the device body indicates a live view mode, the lens unit converts the captured subject image into compressed image data and then transfers the image data to the device body with a predetermined time interval, and the device body decompresses the compressed image data from the lens unit and outputs the decompressed image data to the display unit with a predetermined time interval.

2. An imaging device according to claim 1, wherein the image processing units of the lens unit and the device body perform their respective image processings based on a data transfer capacity of the interface and the setup data and operation data of the device body.

3. An imaging device according to claim 1, wherein when data on an operation mode contained in the setup data of the device body indicates a still image mode, the lens unit converts an output signal from the image sensor into digital data and then transfers the digital data to the device body, and the device body converts the digital data from the lens unit into an image file for storing in the storage unit and into image data for output to the display unit.

4. An imaging device according to claim 1, wherein when data on an operation mode contained in the setup data of the device body indicates a still image mode, the lens unit converts an output signal from the image sensor into digital data and then transfers the digital data to the device body, and the device body converts the digital data from the lens unit into a compressed image file for storing in the storage unit and into image data for output to the display unit.

5. A control method of controlling the imaging device of claim 1, the method comprising:
    allocating the plurality of image processings to the image processing unit of the lens unit and that of the device body; and
    determining the image processings which the device body and the lens unit are to perform based on data communicated via the interface.

6. A method of according to claim 5, wherein the data communicated via the interface is the setup data and operation data of the device body.

7. A method according to claim 5, wherein the data communicated via the interface is the setup data and operation data of the device body and the data on a data transfer capacity of the interface.

8. An imaging device comprising:
    a lens unit which is detachably joined with a device body and comprises an optical lens, an image sensor capturing an optical image of a subject having transmitted through the optical lens and outputting an output signal, and an image processing unit executing a plurality of image processings on image data generated from the output signal of the image sensor;

the device body which comprises a display unit displaying the image data, a storage unit storing an image file containing the image data and an image processing unit having a substantially same image processing function as that of the lens unit and executing a plurality of image processings on the image data;

an allocating unit which changeably allocates the plurality of image processings to be executed on the image data to the image processing units of the lens unit and of the device body; and an interface connecting the lens unit and the device body for bi-directional communication, wherein the image processing unit of the lens unit performs the image processings based on setup data and operation data of the device body communicated via the interface; and wherein the image processing unit of the device body performs the image processings based on the setup data and operation data of the device body; and wherein when data on an operation mode contained in the setup data of the device body indicates a live view mode, the lens unit converts the captured subject image into image data and then transfers the image data to the device body with a predetermined time interval, and the device body outputs the image data from the lens unit to the display unit with a predetermined time interval.

9. An imaging device comprising:

a lens unit which is detachably joined with a device body and comprises an optical lens, an image sensor capturing an optical image of a subject having transmitted through the optical lens and outputting an output signal, and an image processing unit executing a plurality of image processings on image data generated from the output signal of the image sensor;

the device body which comprises a display unit displaying the image data, a storage unit storing an image file containing the image data and an image processing unit having a substantially same image processing function as that of the lens unit and executing a plurality of image processings on the image data;

an allocating unit which changeably allocates the plurality of image processings to be executed on the image data to the image processing units of the lens unit and of the device body; and an interface connecting the lens unit and the device body for bi-directional communication, wherein the image processing unit of the lens unit performs the image processings based on setup data and operation data of the device body communicated via the interface; and wherein the image processing unit of the device body performs the image processings based on the setup data and operation data of the device body; and wherein when data on an operation mode contained in the setup data of the device body indicates a live view mode, the lens unit converts an output signal from the image sensor into digital data and transfers the digital data to the device body with a predetermined time interval, and the device body converts the digital data from the lens unit into image data and outputs the image data to the display unit with a predetermined time interval.

10. An imaging device comprising:

a lens unit which is detachably joined with a device body and comprises an optical lens, an image sensor capturing an optical image of a subject having transmitted through the optical lens and outputting an output signal, and an image processing unit executing a plurality of image processings on image data generated from the output signal of the image sensor;

the device body which comprises a display unit displaying the image data, a storage unit storing an image file containing the image data and an image processing unit having a substantially same image processing function as that of the lens unit and executing a plurality of image processings on the image data;

an allocating unit which changeably allocates the plurality of image processings to be executed on the image data to the image processing units of the lens unit and of the device body; and an interface connecting the lens unit and the device body for bi-directional communication, wherein the image processing unit of the lens unit performs the image processings based on setup data and operation data of the device body communicated via the interface; and wherein the image processing unit of the device body performs the image processings based on the setup data and operation data of the device body; and wherein when data on an operation mode contained in the setup data of the device body indicates a still image mode, the lens unit converts the captured subject image into compressed image data and then transfers the image data to the device body, and the device body converts the compressed image data from the lens unit into a compressed image file for storing in the storage unit and decompresses the compressed image data for output to the display unit.

11. An imaging device comprising:

a lens unit which is detachably joined with a device body and comprises an optical lens, an image sensor capturing an optical image of a subject having transmitted through the optical lens and outputting an output signal, and an image processing unit executing a plurality of image processings on image data generated from the output signal of the image sensor;

the device body which comprises a display unit displaying the image data, a storage unit storing an image file containing the image data and an image processing unit having a substantially same image processing function as that of the lens unit and executing a plurality of image processings on the image data;

an allocating unit which changeably allocates the plurality of image processings to be executed on the image data to the image processing units of the lens unit and of the device body; and an interface connecting the lens unit and the device body for bi-directional communication, wherein the image processing unit of the lens unit performs the image processings based on setup data and operation data of the device body communicated via the interface; and wherein the image processing unit of the device body performs the image processings based on the setup data and operation data of the device body; and wherein when data on an operation mode contained in the setup data of the device body indicates a video mode, the lens unit compresses and converts the captured subject image into video data and then transfers the video data to the device body, and the device body converts the compressed video data from the lens unit into a compressed video file for storing in the storage unit and decompresses the compressed video data for output to the display unit.

12. An imaging device comprising:
a lens unit which is detachably joined with a device body and comprises an optical lens, an image sensor capturing an optical image of a subject having transmitted through the optical lens and outputting an output signal, and an image processing unit executing a plurality of image processings on image data generated from the output signal of the image sensor;
the device body which comprises a display unit displaying the image data, a storage unit storing an image file containing the image data and an image processing unit having a substantially same image processing function as that of the lens unit and executing a plurality of image processings on the image data;
an allocating unit which changeably allocates the plurality of image processings to be executed on the image data to the image processing units of the lens unit and of the device body; and
an interface connecting the lens unit and the device body for bi-directional communication, wherein the image processing unit of the lens unit performs the image processings based on setup data and operation data of the device body communicated via the interface; and wherein the image processing unit of the device body performs the image processings based on the setup data and operation data of the device body; and
wherein when data on an operation mode contained in the setup data of the device body indicates a video mode, the lens unit converts and compresses the captured subject image into video data and then transfers the video data to the device body, and the device body converts the compressed video data from the lens unit into a compressed video file in a different format for storing in the storage unit and decompresses the compressed video data for output to the display unit.

13. An imaging device comprising:
a lens unit which is detachably joined with a device body and comprises an optical lens, an image sensor capturing an optical image of a subject having transmitted through the optical lens and outputting an output signal, and an image processing unit executing a plurality of image processings on image data generated from the output signal of the image sensor;
the device body which comprises a display unit displaying the image data, a storage unit storing an image file containing the image data and an image processing unit having a substantially same image processing function as that of the lens unit and executing a plurality of image processings on the image data;
an allocating unit which changeably allocates the plurality of image processings to be executed on the image data to the image processing units of the lens unit and of the device body; and
an interface connecting the lens unit and the device body for bi-directional communication, wherein the image processing unit of the lens unit performs the image processings based on setup data and operation data of the device body communicated via the interface; and wherein the image processing unit of the device body performs the image processings based on the setup data and operation data of the device body; and
wherein when data on an operation mode contained in the setup data of the device body indicates a video mode, the lens unit converts and compresses the captured subject image into video data in two different formats and then transfers the video data to the device body, and the device body converts one of the two formats of the compressed video data from the lens unit into a compressed video file for storing in the storage unit and decompresses the other of the two formats of the compressed video data for output to the display unit.

* * * * *

UNITED STATES PATENT AND TRADEMARK OFFICE
CERTIFICATE OF CORRECTION

| | |
|---|---|
| PATENT NO. | : 8,760,540 B2 |
| APPLICATION NO. | : 13/143667 |
| DATED | : June 24, 2014 |
| INVENTOR(S) | : Takashi Maki et al. |

Page 1 of 1

It is certified that error appears in the above-identified patent and that said Letters Patent is hereby corrected as shown below:

In the Claims, please delete the words with strikethrough as follows:

Col. 14 line 49: A ~~control~~ method of controlling the imaging . . .

Col. 14 line 57: A method ~~of~~ according to claim 5 . . .

Signed and Sealed this
Seventh Day of October, 2014

Michelle K. Lee
*Deputy Director of the United States Patent and Trademark Office*